Aug. 25, 1964  J. D. HUME ET AL  3,145,520
HARVESTER REEL
Filed Feb. 25, 1963  8 Sheets-Sheet 7

INVENTORS.
JAMES D. HUME
EARL L. SCHEIDENHELM
BY
ATTYS.

United States Patent Office 3,145,520
Patented Aug. 25, 1964

3,145,520
HARVESTER REEL
James D. Hume and Earl L. Scheidenhelm, Mendota, Ill.,
assignors to Horace D. Hume, Mendota, Ill.
Filed Feb. 25, 1963, Ser. No. 260,360
4 Claims. (Cl. 56—220)

This invention relates to a novel reel for harvesters and other agricultural implements.

The present invention is concerned with a harvester reel designed particularly for quick assembly by the retailer. In the past it has been customary to ship harvester reels completely disassembled, requiring both skill and time at the retail outlet in order to prepare the reel for sale.

The present invention is contemplated in order to lessen this assembly time at the retail level and to further reduce the total assembly costs of the manufacturer and distributor.

It is a first object of this invention to provide a reel which may be partially assembled by the manufacturer in preparation for shipment. According to this invention the reel will be shipped in the form of radial spiders and longitudinal members which may be efficiently transported in a disassembled state and which will permit ready assembly at their final destination.

Another object of this invention is to provide a lightweight reel assembly, reducing the weight and cost of the reel units while insuring adequate strength and stability.

Another object of this invention is to provide a simple truss system for transmitting rotational forces across the reel so as to protect its lightweight components.

These and further objects will be evident from a study of the following description taken in conjunction with the accompanying drawings which illustrate a preferred form of the invention. It is to be understood that this form is intended only to be exemplary and is not to limit or restrict the scope of the invention, which is set out in the claims which follow.

Figure 10:
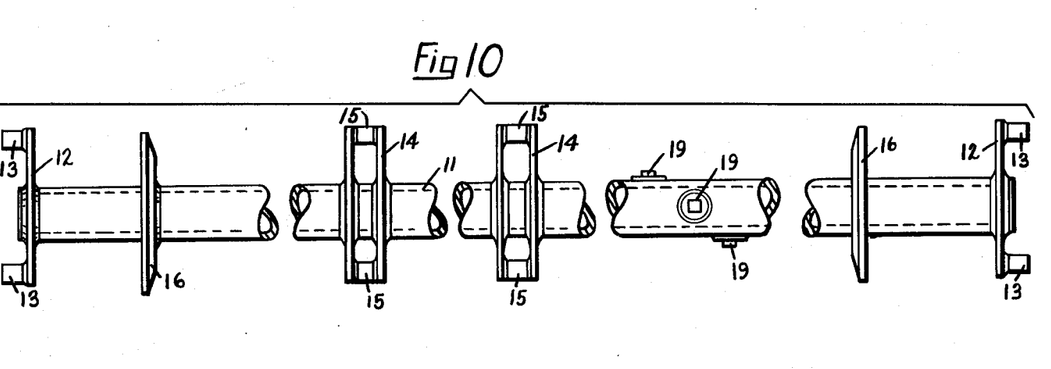
FIGURE 10 is an enlarged fragmentary side view of the central supporting reel shaft.
Figure 18:
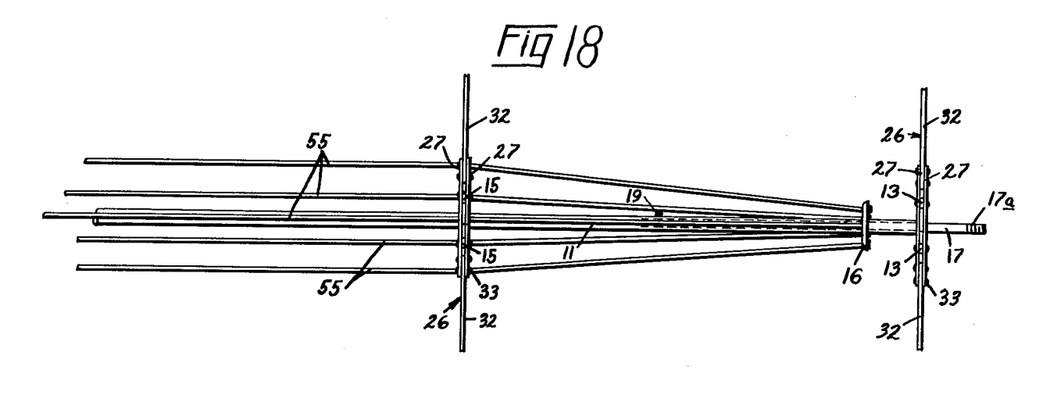
FIGURE 18 is a reduced view of the right hand end of the central reel parts, with each arm broken away.
Figure 19:
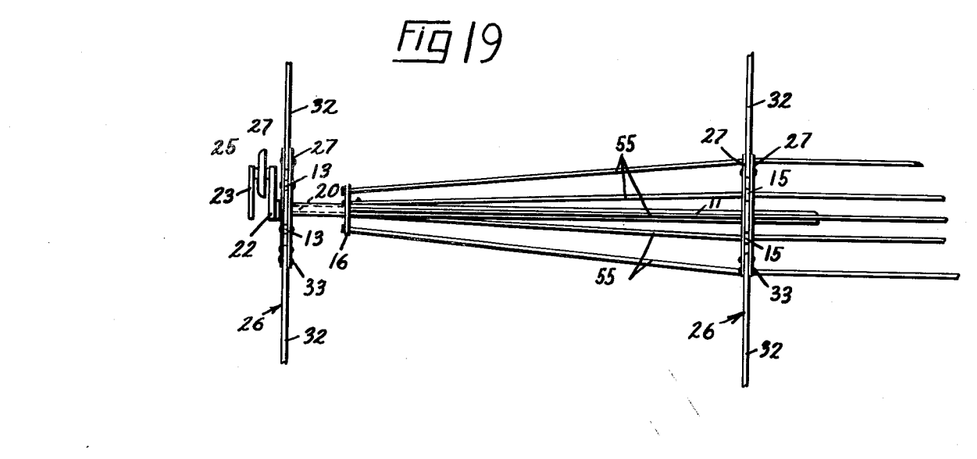
FIGURE 19 is a view similar to FIGURE 18 showing the opposite reel end.

Referring now to the drawings, there is shown a novel reel 10 which is generally supported on a central tubular shaft 11, the details of which can best be seen in FIGURES 10, 18 and 19. Mounted at each end of the shaft 11 are triangular end brackets 12. Each bracket 12 comprises a single triangular plate and has mounted thereon three apertured spacers 13. Located at regularly spaced distances along the length of the shaft 11 are double triangular brackets 14. Each bracket 14 comprises a pair of parallel triangular plates joined together by rigid apertured spacers 15. Also located adjacent the end brackets 12 are a pair of anchor washers 16 which are circular, and which are provided with apertures for the reception of tuss rods to be described below.

Figure 8:
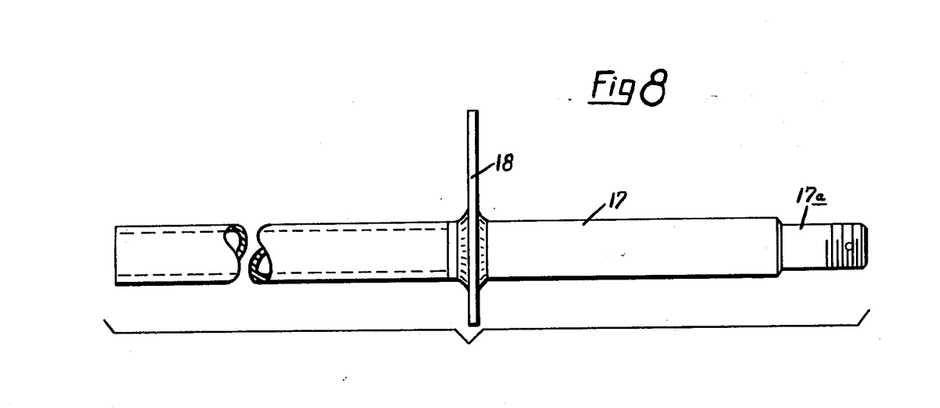
FIGURE 8 is an enlarged side view of the supporting central shaft at the drive end of the reel.
Figure 9:
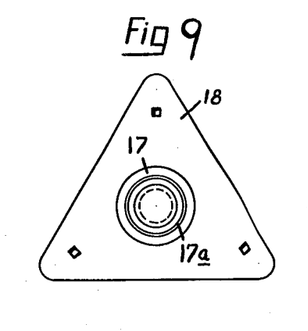
FIGURE 9 is an end view taken toward the right hand end of FIGURE 8.

The hollow shaft 11 is supported at each end by individual mounting shafts. At the drive end of the reel 10 is a mounting shaft 17 shown in detail in FIGURES 8 and 9. The mounting shaft 17 is provided with a triangular bracket 18 adapted to be secured to the right hand end of bracket 12, shown in FIGURE 10. The shaft 17 is of a diameter which will fit rather snugly within the shaft 11 and is clamped at its inward end by means of three set screws 19. The shafts 11 and 17 are further joined by means of a triangular bracket 18 fixed to the shaft 17 and adapted to abut the spacers 13 on the right hand end bracket 12, as shown in FIGURES 10 and 18. The shaft 17 is provided with a smooth cylindrical portion directly adjacent its outer end and capped by a threaded portion 17a on which may be mounted a driving pulley. The pulley might also be keyed or otherwise attached to shaft 17.

Figure 11:
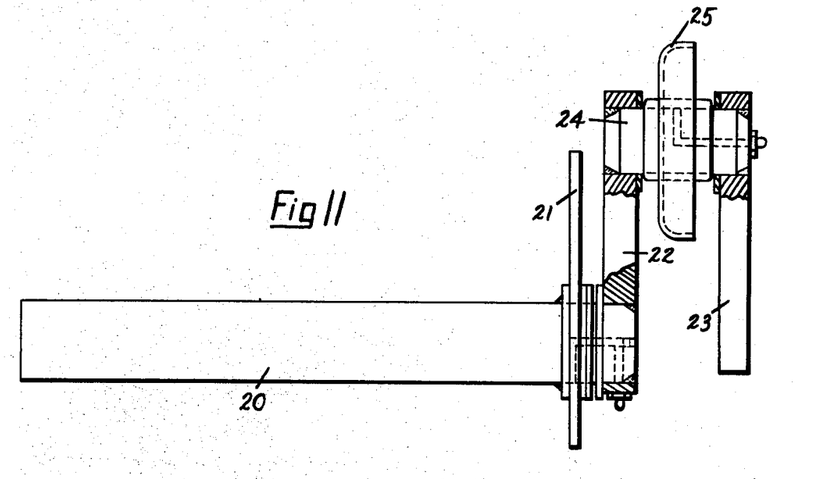
FIGURE 11 is an enlarged side view of the supporting central shaft at the idle end of the reel.
Figure 12:
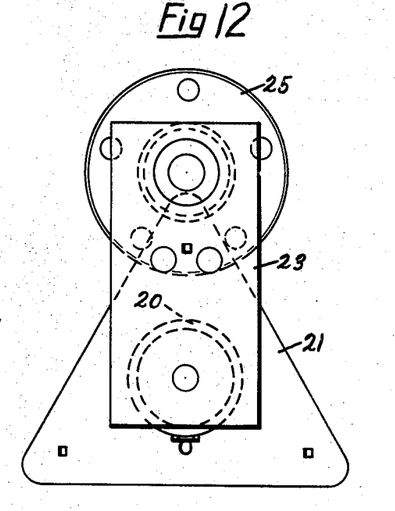
FIGURE 12 is an end view taken looking toward the right hand end of FIGURE 11.

At the idle end of the reel 10 is a second mounting shaft 20, shown in FIGURE 11. The shaft 20 is of a diameter such as to enable the shaft 20 to be received within the left hand end of the shaft 11, as shown in FIGURE 10. Again a triangular bracket 21 is provided which is designed to abut the spacers 13 on the respective end bracket 12. However, in this instance bracket 21 is rotatable on shaft 20. Shaft 20 is fixed to a rigid crank 22 which in turn is fixed relative to an eccentric adapted bracket 23 by welded connection to an intermediate eccentric shaft 24. Rotatably mounted on the shaft 24 is a cupped idler disk 25 which shall be described below.

Figure 2:
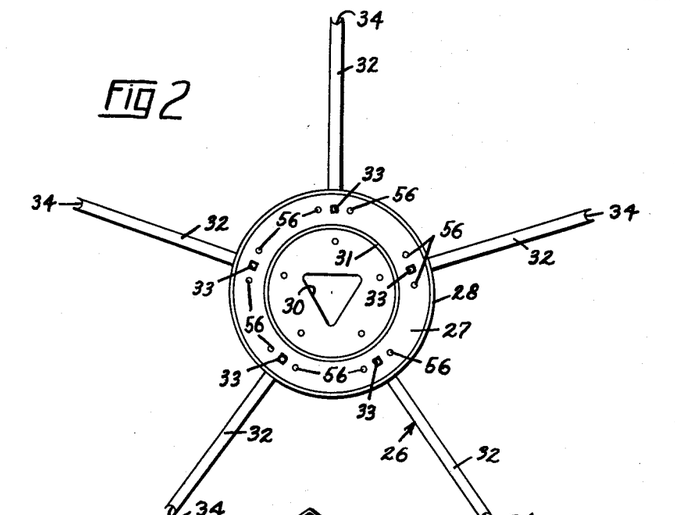
FIGURE 2 is an enlarged side elevation view of a preassembled spider.
Figure 14:
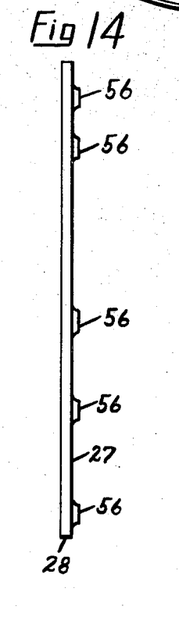
FIGURE 14 is an end view of the plate seen in FIGURE 13.
Figure 15:
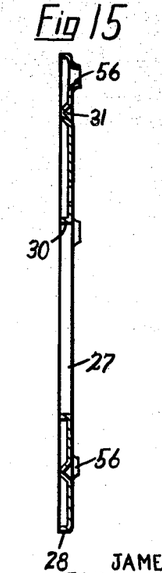
FIGURE 15 is a sectional view taken along line 15—15 in FIGURE 13.
Figure 16:
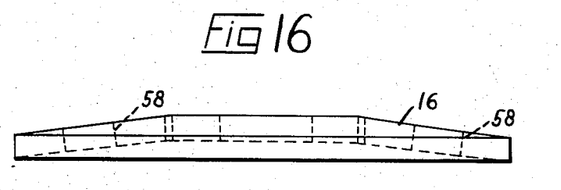
FIGURE 16 is an enlarged side view of a truss anchor washer.

The basic building unit of the present reel is illustrated in FIGURE 2. This is a spider 26 which includes a pair of hub plates 27, each of which has a bent outer edge 28, as may be seen in better detail in FIGURES 13, 14 and 15. The plates 27 are preferably stamped from light weight sheet metal and are reenforced by the bending of the outer edges 28 and by the bending of a central triangular aperture having edges 30, which are also bent outwardly on each plate 27. Further strength is gained by an annular reenforcing ring 31 stamped on each plate intermediate the outer edges 28 and the aperture edges 30. A pair of plates 27 are mounted back to back and separated by radial arms 32 which extend outwardly in an equiangular relation to one another. The two plates 27 are joined to the arms 32 and to one another by means of bolts 33 to form a rigid pre-assembled spider which may be shipped in the condition illustrated in FIGURE 2.

The arms 32 are grooved at their outer ends 34 to form a semi-cylindrical surface adapted to act as a bearing surface for the bat shafts which must be supported thereby in the completed reel assembly.

Figures 4, 5:
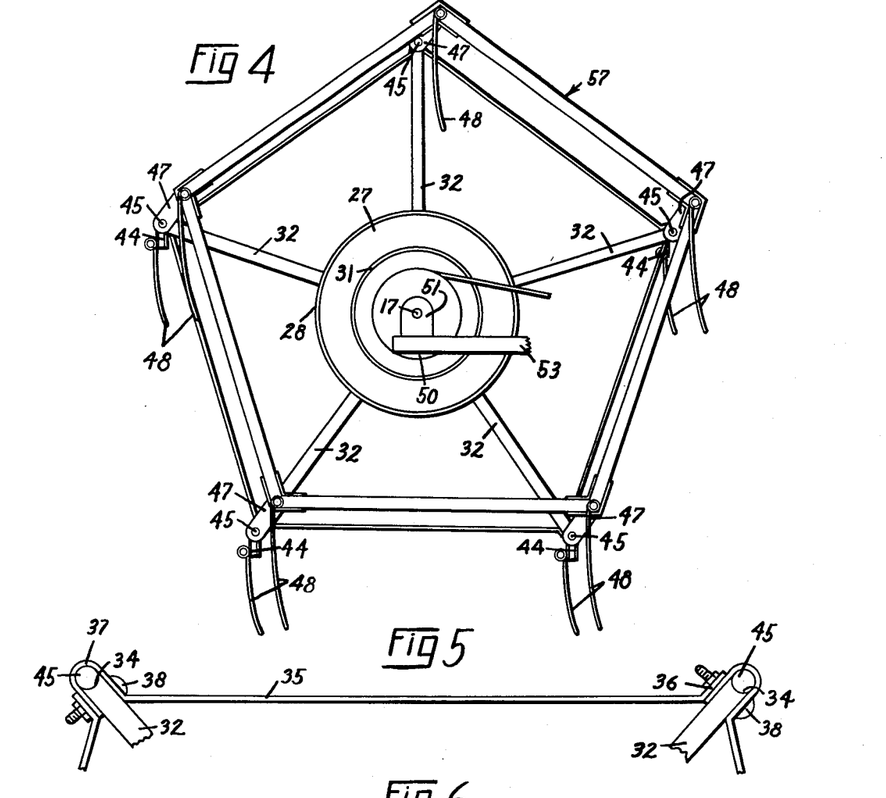
FIGURE 4 is an enlarged end view opposite to that shown in FIGURE 3.
FIGURE 5 is an enlarged side view showing a first form of reel brace.
Figure 6:
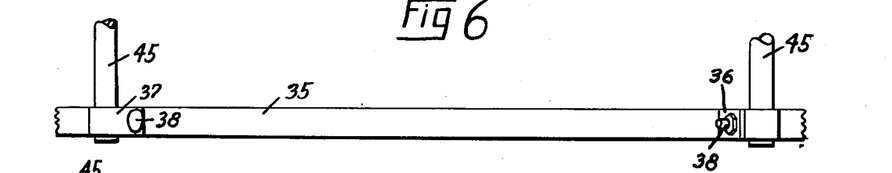
FIGURE 6 is a top view of the brace as shown in FIGURE 5.

In FIGURES 5 and 6, I have illustrated a novel brace for connecting the outer ends of the arms 32 and completing the necessary bearing structure for the bat shafts. The brace 35 is a strap having a bent end 36 adapted to be mounted adjacent one surface of an arm 32. The brace 35 is bent at its remaining end in a U-shaped configuration 37 which is adapted to receive the end 34 of the adjacent arm 32 to complete the cylindrical bearing structure. Two braces 35 are joined to the respective ends 36 and 37 by a single bolt 38, as may be seen in FIGURE 5. Thus the braces 35 can be readily assembled using a single bolt on each arm 32.

Figure 7:
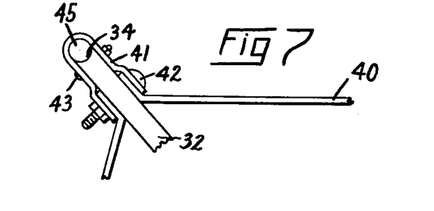
FIGURE 7 is a view similar to the left hand end of FIGURE 5 showing a second form of brace.

As an alternative to the integral brace shown in FIGURES 5 and 6, I also propose a two-piece brace and clip shown in FIGURE 7. In this instance the strap 40 is complemented by small clips 41 which are U-shaped and which are slotted to receive bolts 42. The openslotted clips 41 fit over the bent ends of strap 40 to complete the necessary bearing structure. In this instance, two bolts are required at each arm 32. The first bolt 42 holds the ends of the strap 40 and the clip 41 in place while a second bolt 43 secures the clip 41 to the arm 32 to stabilize the bearing portions of the clip 41. Bolts 42 need not be removed to facilitate replacement of clips 41.

Figure 1:
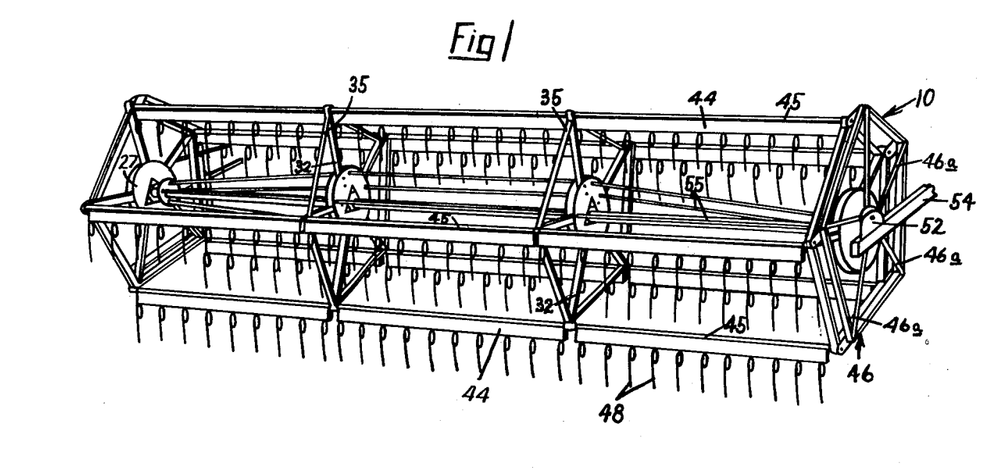
FIGURE 1 is a front perspective view of a complete reel assembly as it would be mounted on an agricultural implement.
Figure 3:
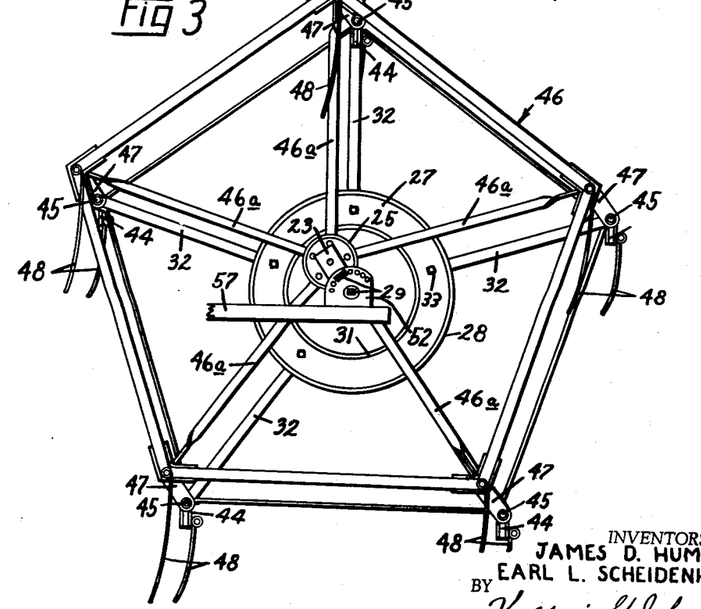
FIGURE 3 is an enlarged side view of the idler end of the reel shown in FIGURE 1.

As may be seen in FIGURES 1, 3 and 4, the reel includes longitudinal bats 44 which are fixed to bat shafts 45 rotatably carried at the outer ends of arms 32. At the idle end of the reel 10 is a rigid polygon 46 having arms 46a joined to the idler disk 25 described above. The polygon 46 is pivotally connected to cranks 47, fixed to the respective bat shafts 45 so as to fix the relative angular position of the bat shafts 45 and bats 44 relative to the supporting framework of the implement on which the reel 10 is mounted. A second polygon 57 is mounted in like manner at the driving end of reel 10. The bats 44 and polygons 46 and 57 are provided with the usual times 48 to aid in combing a crop being harvested.

The mounting of the reel 10 on an implement is accomplished by utilizing a bearing 51 at the drive end of the reel 10. The bearing 51 is secured to a frame member 53 and a pulley 50 is provided for turning the reel shaft 11 through the mounting shaft 17. At the remaining end of reel 10 is an eccentric adjustment plate 52 fixed to a frame member 54. The eccentric adapter 23 is secured to the plate 52 by any suitable means and the angle subtended by the adapter 23 relative to the plate 52 will determine the resultant angular relation of the tines 48 relative to the implement frame. The shaft 11 is free to rotate on the supporting shaft 17.

Figure 13:
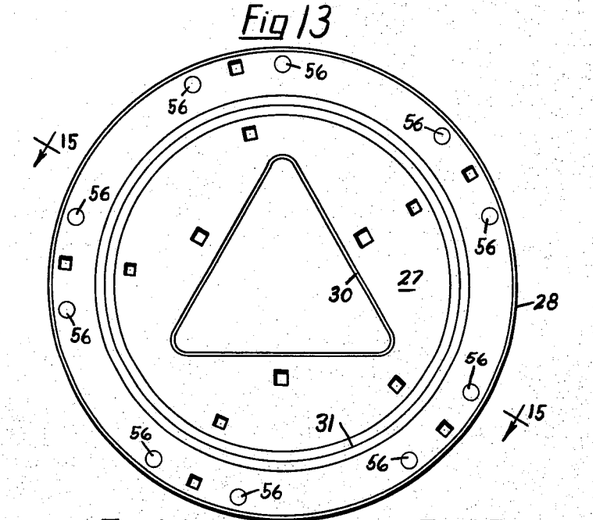
FIGURE 13 is an enlarged side view of a single hub plate.

The light weight reel construction as described is preferably strengthened by means of longitudinal truss rods 55, anchored at their ends to the washers 16 fixed to shaft 11. Apertures 56 receive rods 55 in the hub plates 27. As shown in FIGURE 13 the apertures 56 prevent misassembly of the plates 27. In order to provide a true truss structure, the rods 55 must be in tension and must pass through apertures 56 located radially outward of the anchor position of the rods 55 on the washers 16. The ends of rods 55 bear against the outer surfaces of washers 16. Thus, torsion in the reel 10 will be transmitted throughout the length of the reel so as to provide a stable structure over the normal reel lengths used in agricultural production.

The reel assembly described provides a unique structure which may be partially assembled at a factory or main distribution site and which may be readily assembled by the final retailer or consumer. The steps of assembling the reel components as described above are extremely simple. The consumer first mounts the necessary number of spiders 26 on the central tubular shaft 11. This is accomplished by fitting the aperture edges 30 of the plate 27 over the triangular brackets 12 and 14 and turning the plate 27 so that the plate 27 may be secured through the spacers 13 and 15 by means of bolts 29. After the spiders 26 are fixed to the shaft 11, the consumer then adds truss rods 55 which extend through apertures 56 in the plates 27. The truss rods 55 must be properly tightened against the rings 16 so as to be in proper tension. Normally the bat shafts 45, bat 44 and the tine 48 are shipped in a pre-assembled unit, and these are next positioned at the outer ends 34 of the arms 32. The bat shafts 45 are secured by means of braces 35, or the alternative straps 40 and clips 41. This completes the central reel structure. The user then rotatably mounts the shaft 20 at the idle end of the reel shaft 11 and connects polygon 46 to the rotatable disk 25 and to the bat shafts 45 by means of cranks 47. At the drive end of the reel 10 is fixed the shaft 17 by means of the set screws 19 and the bolts 29 which join its bracket 18 to the end bracket 12. The reel 10 is then lifted onto the frame members 54 and 53 and secured in place as described above.

Figure 17:
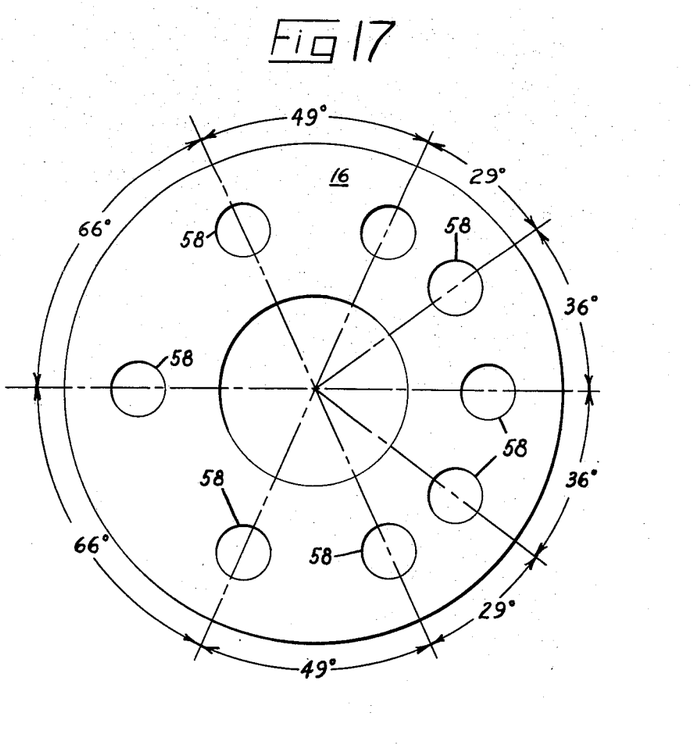
FIGURE 17 is a top view of the washer shown in FIGURE 16.

The present reel 10 may be of any desired length, which will necessarily determine the number of spiders 26 required in a given reel. Also, the reel may be used for more bats than shown—or for less. The washers 16 are preferably drilled in the angular pattern shown in FIGURE 17 to produce apertures 58 for the reception of truss rods 55. With this pattern, the same washer 16 may be utilized on a five or six bat reel, the rods 55 being bent only slightly to accommodate the angular irregularities in rod spacing.

The operation of the present reel does not differ materially from the operation of previous reels of the same functional style. However, the assembly of this reel has been greatly simplified and the light weight components utilized in this construction have been strengthened for effective and practical use. It is the sub-assembly and assembly features which are the principal concepts in this invention. Obviously some modifications are possible without deviating from this principal concept, and therefore the following claims are intended to be the only restrictive definitions of this invention.

Having thus described my invention, I claim:

1. In a harvester reel:
   a central supporting shaft;
   a plurality of triangular brackets fixed to said shaft and spaced from one another along the length thereof;
   a plurality of rigid spiders corresponding in number to said brackets, each spider comprising a hub consisting of two plates mounted back to back and adapted to fit at each side of a bracket, said plates being provided with aligned central triangular apertures complementary to, and adapted to receive, said brackets, each spider further comprising a plurality of equiangularly spaced radial arms projecting radially outward therefrom;
   means adapted to connect each hub to the bracket on which it is mounted;
   and brace means joining the outer ends of each adjacent pair of arms on each spider and forming a shaft-receiving bearing therewith.

2. A reel structure as defined in claim 1 wherein said spiders are pre-assembled, each plate having an outer edge bent outwardly opposite to one another, said triangular apertures being bounded by outwardly bent edges and further including a stamped annular ring bent therein intermediate said outer edge and said triangular aperture, said plates being fabricated of light sheet material.

3. In a harvester reel:
   a central supporting shaft;
   a plurality of polygonal brackets fixed to said shaft and longitudinally spaced from one another along the length thereof;
   a plurality of rigid spiders corresponding in number to said brackets, each spider comprising a hub consisting of two plates mounted back to back and adapted to fit at each side of a single bracket, said plates being provided with aligned central polygonal apertures complementary to, and adapted to receive, said brackets, each spider further comprising a plurality of equiangularly spaced radial arms projecting radially outward therefrom;

means adapted to connect each hub to the bracket on which it is mounted;

and brace means joining the outer ends of each adjacent pair of arms on each spider.

4. In a harvester reel:

a central supporting shaft;

a plurality of polygonal brackets fixed to the shaft and longitudinally spaced from one another along the length thereof;

a plurality of rigid spiders corresponding in number to said brackets, each spider comprising a hub plate adapted to fit at one side of a bracket, each hub plate being provided with a central polygonal aperture complementary to and adapted to receive, said brackets, each spider further comprising a plurality of equiangularly spaced radial arms projecting radially outward therefrom;

means adapted to connect each hub plate to the bracket on which it is mounted;

and brace means joining the outer ends of each adjacent pair of arms on each spider.

References Cited in the file of this patent

UNITED STATES PATENTS

| | | | |
|---|---|---|---|
| 1,470,061 | Coulter | Oct. 9, | 1923 |
| 2,115,385 | Edgington | Aug. 26, | 1938 |
| 2,431,397 | Harrison | Nov. 25, | 1947 |